350-376 SR
XR 3,815,107

United St

Almasi

[11] 3,815,107
[45] June 4, 1974

[54] CYLINDRICAL MAGNETIC DOMAIN DISPLAY SYSTEM

[75] Inventor: George S. Almasi, Purdy Station, N.Y.

[73] Assignee: International Business Machines Corporation, Armonk, N.Y.

[22] Filed: June 30, 1971

[21] Appl. No.: 158,494

[52] U.S. Cl. ................ 340/174 YC, 340/174 TF, 340/174 SR, 350/151
[51] Int. Cl. ....................... G11c 11/42, G11c 11/14
[58] Field of Search . 340/174 TF, 174 YC, 174 SR; 350/151

[56] References Cited

UNITED STATES PATENTS

| | | | |
|---|---|---|---|
| 3,460,116 | 8/1969 | Bobeck et al. | 340/174 TF |
| 3,526,883 | 9/1970 | Tabor | 340/174 TF |
| 3,530,444 | 9/1970 | Bobeck et al. | 340/174 TF |
| 3,618,054 | 11/1971 | Bonyhard | 340/174 TF |
| 3,699,552 | 10/1972 | DeFabritis | 340/174 TF |

OTHER PUBLICATIONS

Electronics, "Magnetic Bubbles–A Technology in the Making" by Karp, Sept. 1, 1969, p. 83–87.
Bell Laboratories Record, "The Magnetic Bubble" by Bobeck, June/July 1970, p. 163–170.

*Primary Examiner*—Stanley M. Urynowicz, Jr.
*Attorney, Agent, or Firm*—Jackson E. Stanland

[57] ABSTRACT

A flat display system using cylindrical magnetic domains existing within a magnetic sheet, such as orthoferrite or garnet. Located on the magnetic sheet is a propagation means corresponding to a horizontal shift register and a plurality of vertical shift registers for transferring the content of the horizontal shift register in a direction transverse to the data flow in the horizontal shift register. The vertical shift registers are terminated with domain collapsers. The domain generator supplies domains serially into the horizontal shift register in accordance with an applied data signal. When fully loaded, the contents of the horizontal register are shifted in parallel by the vertical registers. This continues until the entire pattern is on the magnetic sheet, after which the sheet is illuminated by incident polarized light. An analyzer is used to differentiate light which passes through a domain from that which does not pass through a domain. Consequently, an image corresponding to the stored domain pattern is viewed. Commercial TV applications are possible.

10 Claims, 21 Drawing Figures

3815107
OR IN 365/10

INVENTOR
GEORGE S. ALMASI

BY J. E. Haulan
AGENT

CYLINDRICAL MAGNETIC DOMAIN DISPLAY SYSTEM

BACKGROUND OF THE INVENTION

1. Field of the Invention

This invention relates to a flat display system, and more particularly to one which uses cylindrical magnetic domains.

2. Description of the Prior Art

Flat display systems are known in the art, examples of which include the gas panel displays, liquid crystal displays, electroluminescent displays, and photoconductor displays. In general, these displays have a storage medium (gas, photoconductor, etc.) at small cell positions which are addressed by coincident currents in conductors located on each side of the cell or on the same side of the cell. Application of coincidents current will activate the storage medium in the selected cell, thereby creating light at locations corresponding to the desired image.

These prior flat display systems have disadvantages, one of the most serious being the requirement for coincident currents. This leads to a large number of interconnections and lead-in wires to the display system, which in turn requires a substantial number of drivers and associated clocking circuits. In addition, a large number of fabrication steps is required to build these display systems, and the power requirements are high. The speed of such displays is limited, since decay times and response times with those storage media are not fast.

To eliminate these inherent disadvantages, it is proposed to use cylindrical magnetic domains for displays. These domains are localized regions of magnetization having a magnetization direction normal to the magnetic sheet in which they exist, and opposite to the magnetization of the rest of the sheet. Use of these domains in a display has been proposed, as can be seen by referring to U.S. Pat. No. 3,526,883. In this reference, cylindrical magnetic domains are located at various positions in a magnetic sheet. The size of the domain at each location is regulated by passage of coincident current through conductors which intersect at each storage location. The magnetic fields established by currents in the conductors change the size of the domains at selected locations. Since the size of a domain will affect the amount of light transmitted through the magnetic sheet at each location, activation of coincident current is used to create light images. The disadvantage of this system is that coincident current conductors are required, leading to a large number of interconnections and current generators, etc.

Another optical device using cylindrical magnetic domains is described in the IBM Technical Disclosure Bulletin, Vol. 13, No. 1, June 1970, at page 147. This is an electronic-to-optical image transducer in which a plurality of domain generators are used to enter data into a plurality of propagation channels. The domains travel along these parallel channels into positions forming the desired pattern and remain in those positions as long as desired. The pattern is illuminated to produce an image, the domains forming a variable spatial filter for the input light. The pattern is erased by propagating the domains into domain collapsers located at the end of each channel.

U.S. Pat. No. 3,460,116 describes cylindrical magnetic domains and proposes a possible TV application for these domains. It is suggested that a single domain can be moved back and forth across a magnetic sheet along a path similar to that traversed by an electron beam in a television tube. However, no means is shown for performing such a function, and it is not clear that sufficient intensity modulation could be provided using a single domain.

As noted, conventionally known flat display systems have inherent disadvantages which may relate to the coincident currents used to operate such displays. The cylindrical domain displays described in the art also have some of these disadvantages, and do not offer a compatible mode of operation which would be required for commercial TV applications.

Accordingly, it is a primary object of this invention to provide a flat display system using cylindrical magnetic domains in which a minimum number of electronic interconnections are required.

It is another object of this invention to provide an improved cylindrical magnetic domain display system which has low power requirements and long lifetime.

It is still another object of this invention to provide an improved cylindrical magnetic domain display system which does not require extension fabrication and which provides high quality images.

It is a further object of this invention to provide a display system using cylindrical magnetic domains which gives high resolution and has fast response to applied data inputs.

It is a further object of this invention to provide an improved cylindrical magnetic domain display suitable for commercial TV applications.

It is a still further object of this invention to provide an improved cylindrical magnetic domain display system which is suitable for TV applications and which can be housed in an exceptionally small enclosure, suitable for use as a wrist TV.

SUMMARY OF THE INVENTION

This display system includes a magnetic sheet in which cylindrical domains exist and can be propagated. The magnetic sheet can be chosen from any of the known cylindrical magnetic domain materials, including orthoferrites, garnets, and hexaferrites.

Writing means are provided for generation of cylindrical domains in accordance with an applied write pulse. The writing means comprises a domain generator which may be located on the magnetic sheet, and a write pulse source, which provides current pulses to the domain generator. For instance, the writing means may utilize a domain generator which is a deposit of soft magnetic material on the magnetic sheet having a control loop associated therewith. Depending upon the presence and absence of current in the control loop, domains will be provided to the propagation means which is also located on the magnetic sheet.

The propagation means receives domains from the writing means and comprises a serial-to-parallel device using a horizontal shift register and a plurality of vertical shift registers associated with the storage positions of the horizontal shift register. The propagation means utilizes conventional elements, such as permalloy patterns or conductor patterns. Both of these patterns are well known in the prior art, as can be seen by reference to U.S. Pat. No. 3,541,534, U.S. Pat. No. 3,518,643, and U.S. Pat. No. 3,460,116. If desired, removable overlays containing the propagation means can be used. Such overlays are described in U.S. Pat. No. 3,573,765.

The polarized light source comprises a source of light and a polarizing sheet and is used to provide the polarized light for illumination of the magnetic sheet after the desired domain pattern has been loaded into the sheet. A light activation means is used to turn on the light source when desired. Another polarizing sheet, the analyzer, is located on the other side of the magnetic sheet to receive the polarized light which passes through the sheet. The analyzer blocks light having a particular rotation and transmits light having the opposite rotation.

Domain collapsers are located at the end of the vertical shift registers for collapsing domains after their travel long these registers. These domain collapsers clear the magnetic sheet so that different domain patterns can be put into the magnetic sheet.

The scanning rates possible in this invention allow commercial TV applications. Thus, rapid loading of domain patterns into the sheet and viewing within a time period less than the vision persistence of an individual are provided.

These and other objects, features, and advantages will be more apparent from the following detailed description of the preferred embodiments.

DETAILED DESCRIPTION OF THE PREFERRED EMBODIMENTS

Figure 1:
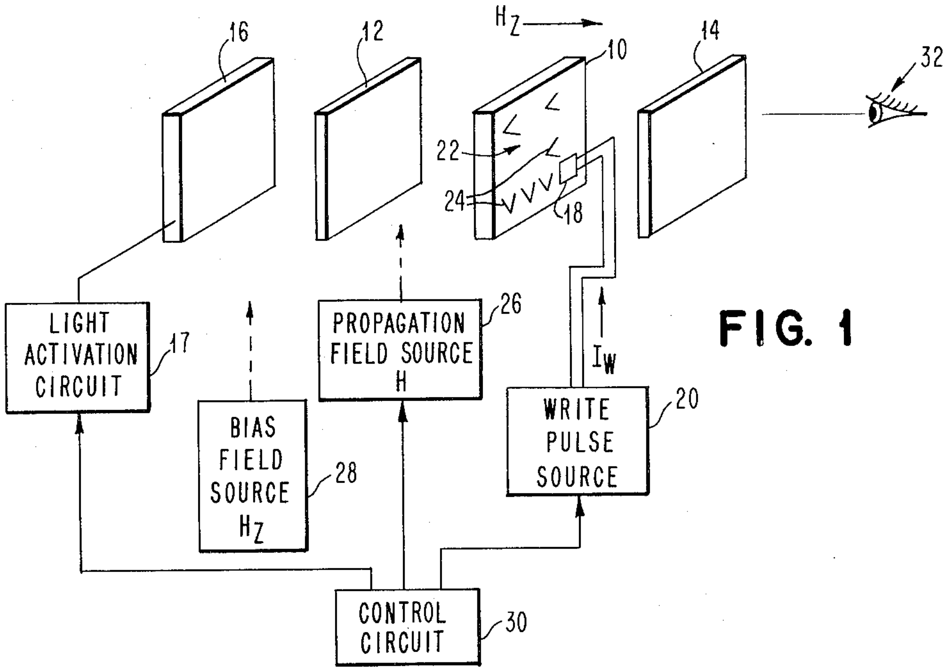
FIG. 1 is an exploded view of the subject cylindrical domain display apparatus including the control circuitry.

FIG. 1 shows an exploded view of a cylindrical domain display system which can be made flat and very small.

A magnetic sheet 10, such as orthoferrite or garnet, is located between a polarizer 12 and an analyzer 14. Associated with the polarizer is a light source 16, which could be a light emitting diode or an array of diodes electrically in parallel. Light source 16 is activated by electronic pulses from light activation circuit 17. Located on the magnetic sheet 10 is a domain generator 18 that operates under control of electronic pulses from write pulse source 20. Also located on magnetic sheet 10 is a propagation means 22, which moves domain produced by generator 18 to selected locations in magnetic sheet 10. For convenience, propagation means 22 is shown as a series of soft magnetic elements 24 which are used to create attractive poles for movement of domains, under the influence of the in-plane, rotating magnetic field (H) produced by propagation field source 26. Of course, the propagation means can comprise conductor patterns, in which case the propagation source 26 would produce multi-phase current pulses for driving the conductor pattern.

A stabilizing magnetic field $H_z$ exists normal to the magnetic sheet 10. This field is produced by the bias field source 28, which could be an external coil surrounding sheet 10. Field $H_z$ stabilizes the diameter of cylindrical magnetic domains in sheet 10. If desired, the bias field source could be a permanent magnet (as is shown in U.S. Pat. No. 3,508,221), or an additional magnetic layer in contact with the magnetic sheet 10 (as is shown in U.S. Pat. No. 3,529,303).

A control circuit 30 provides inputs to the light activation circuit 17, the propagation field source 26, and the write pulse source 20. The control circuit is a conventional electronic circuit which provides clocking pulses in order to synchronize operation of the entire device. For instance, control pulses applied to write pulse source 20 cause the domain generator 18 to produce domains within magnetic sheet 10. These domains are propagated to various locations in the magnetic sheet in accordance with the magnetic field produced by source 26, when activated by a control pulse from circuit 30. Another control pulse is used to activate light activation circuit 17 so that light from source 16 will illuminate sheet 10 after the domains have been moved to selected positions within sheet 10.

When sheet 10 is illuminated by light from source 16 a viewer, represented by the eye 32, will see a pattern corresponding to the pattern of cylindrical domains produced in sheet 10. That is, the transmission of light through polarizer 12, magnetic sheet 10, and analyzer 14 will depend upon whether or not cylindrical domains are present. Because the domains have a magnetization different that that of the rest of the magnetic sheet, they will affect polarized light differently than will magnetic sheet 10. This difference can be used to show the domains as light areas on a dark background, or vice versa. The resulting visual characterization of the binary information produced by generator 18 and write pulse source 20 is viewed directly by viewer 32.

Figure 2:
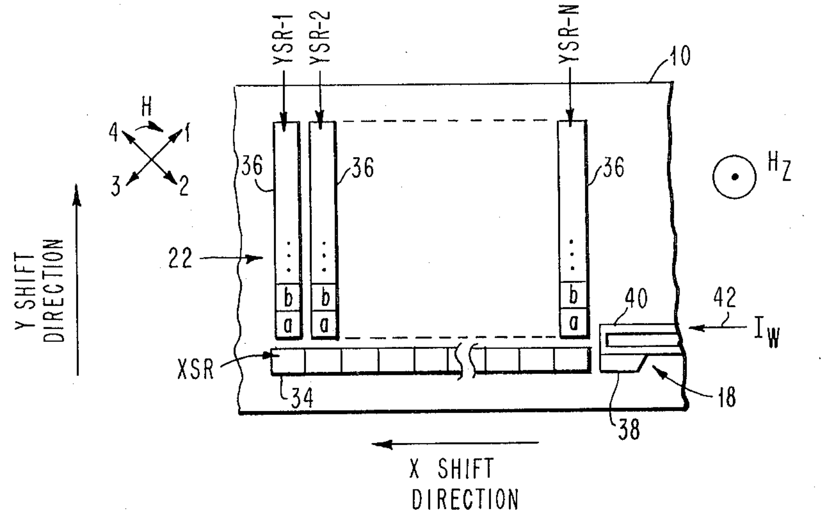
FIG. 2 is a schematic illustration of the writing means and propagation means for loading a cylindrical domain pattern into the magnetic sheet.
Figure 3A:
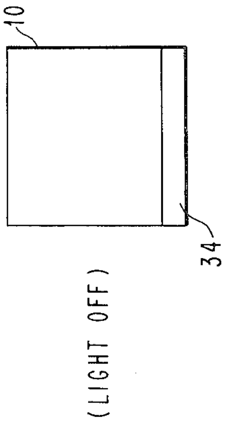
FIGS. 3A–3G show the entry of a domain pattern into the magnetic sheet in response to write pulse inputs applied over a period of time.
Figure 3B:
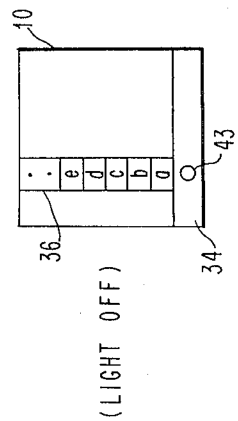
Figure 3C:
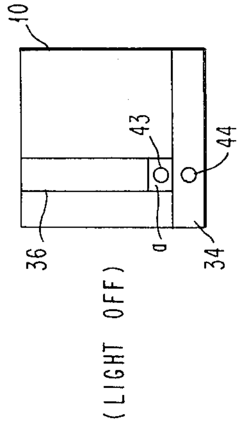
Figure 3D:
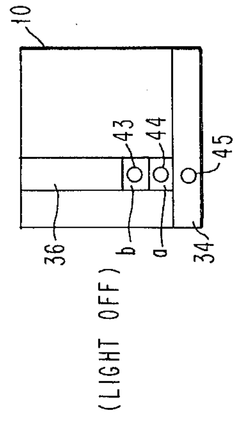

FIG. 2 shows the domain generator 18 and the serial/parallel converter used as the propagation means 22. Propagation means 22 is comprised of a horizontal shift register XSR, designated by numeral 34, which receives the serial domain pattern produced by generator 18. Located adjacent horizontal shift register 34 is a plurality of vertical shift registers YSR–1, YSR–2, . . . YSR–N. In FIG. 2, N = 9. The vertical shift registers are individually referenced by the numeral 36.

Domain generator 18 is comprised of a soft magnetic material 38 (such as permalloy) deposited on the magnetic sheet 10, and a conductor control loop 40 (such as copper) deposited on magnetic material 38 and on magnetic sheet 10. Control loop 40 is connected to write source pulse 20 and receives current pulses ($I_W$) in the direction of arrow 42.

Domain generator 18 produces domains for propagation along horizontal shift register 34 when sufficiently large write pulses are present in conductor loop 40. The action of write pulses in conductor loop 40 is to oppose the bias field $H_Z$ in the area between shift register 34 and domain generator 18. At the same time, current $I_W$ creates a magnetic field inside loop 40 which aids bias field $H_Z$. This means that domains will be attracted to shift register 34 when sufficiently large write pulses are present in conductor loop 40 (FIGS. 4A–4G illustrate this more clearly).

Depending upon the presence (high level) and absence (low level) of write pulses in loop 40, domains will be produced for attraction into shift register 34, under the influence of rotating, in-plane propagation field H. After the horizontal shift register 34 is fully loaded, the contents of this register are shifted in parallel in the Y direction, thereby filling the first bit position (a) of each vertical shift register 36. The horizontal shift register 34 is then fully loaded again, in the manner previously explained. After full loading, the contents of register 34 are shifted in parallel into the first bit position of vertical registers 36. The information which was previously in the first bit positions of registers 36 has been shifted to the second bit positions (b) of these registers. Thus, under the influence of the write pulse source 20, domain generator 18 continually loads the horizontal shift register 34. Each time register 34 is fully loaded, its contents are shifted vertically in parallel into shift registers 36. This continues until all of the magnetic domains corresponding to the binary information entered by write pulse source 20 has been entered into magnetic sheet 10.

At this time, light from source 16 illuminates sheet 10. The viewer 32 will see an image corresponding to the pattern of cylindrical domains entered in magnetic sheet 10.

Figure 4A:
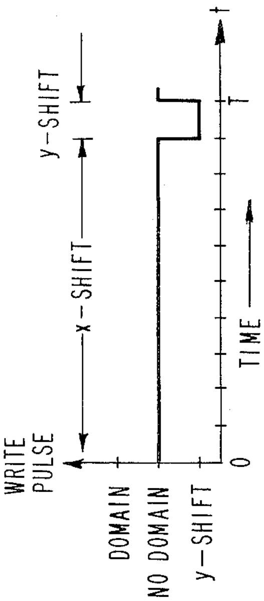
FIGS. 4A–4G are plots of the write pulse input versus time, corresponding to the domain patterns in FIG. 3A–3G.

FIGS. 3A–3G show the magnetic sheet 10 as patterns of cylindrical domains are entered into the registers 34 and 36. The write pulse inputs for producing the patterns shown in FIGS. 3A–3G are shown in FIGS. 4A–4G. The complete image produced when light illuminates sheet 10 after the domains have been properly entered therein is shown in FIG. 5.

Assuming that it is desired to enter the letter L into magnetic sheet 10, the operation of the propagation means 22 and the writing means (domain generator 18 and write pulse source 20) is shown. With light source 16 off, the top line of the picture is written into the horizontal shift register 34. In this case, the entire top line is blank. The top line is written into the horizontal shift register 34 in 0.9T seconds and is transferred into the first bit position of each of the vertical shift registers 36 in 0.1T seconds. FIG. 4A shows this operation. During the first 0.9T seconds, write pulse $I_W$ is held at a level which is not sufficient to produce a domain. After this, a signal provided by control circuit 30 causes the information to be shifted into the first bit positions (a) of registers 36. To accomplish the shift into the Y direction, control circuit 30 produces a shift signal which alters the propagation magnetic field H as will be explained in more detail with reference to FIGS. 6 and 7.

The time T is the total time to achieve one scan line including the return. The total time required to fill magnetic sheet 10 with the desired domain pattern corresponds to the number of scan lines times the amount of time required for each scan line. For viewing purposes, a flicker will not be observed between each image if they appear at intervals less than approximately one-thirtieth of a second. This consideration is standard in TV applications and corresponds to the persistence of vision which allows changing information to be viewed without flicker.

Figure 4B:
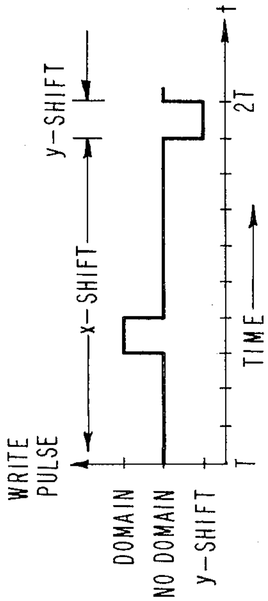
Figure 4C:
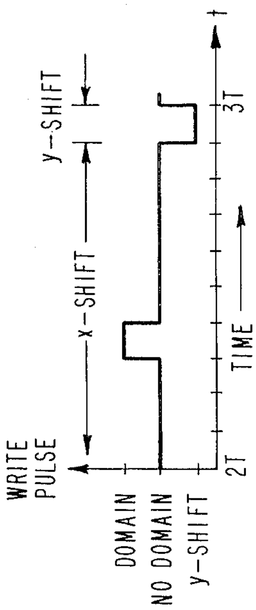
Figure 4D:
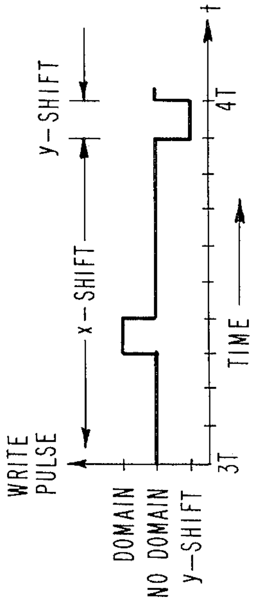
Figure 4E:
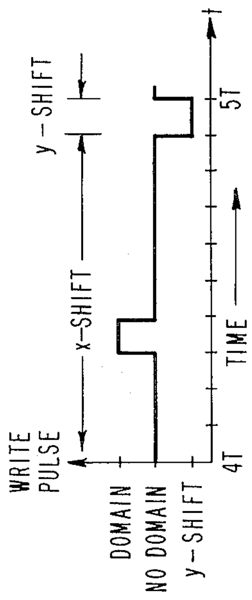
Figure 3E:
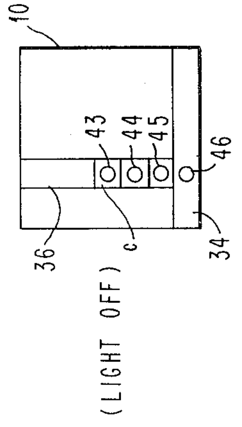
Figure 4F:
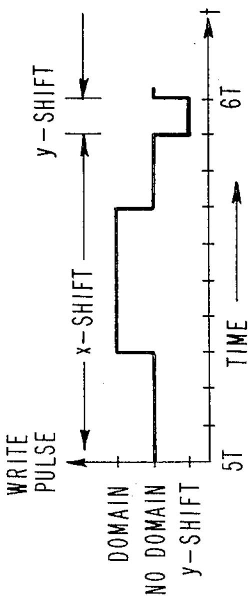
Figure 3F:
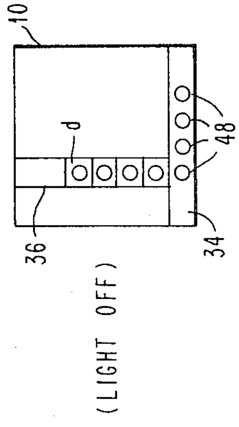
Figure 4G:
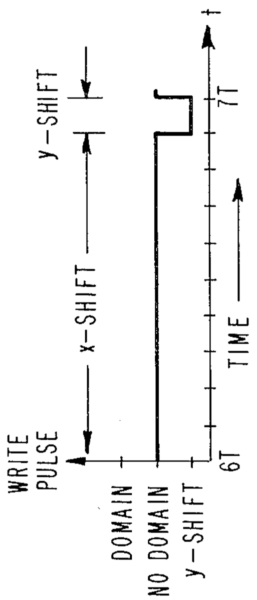
Figure 3G:
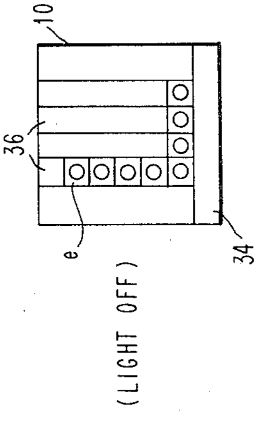
Figure 5:
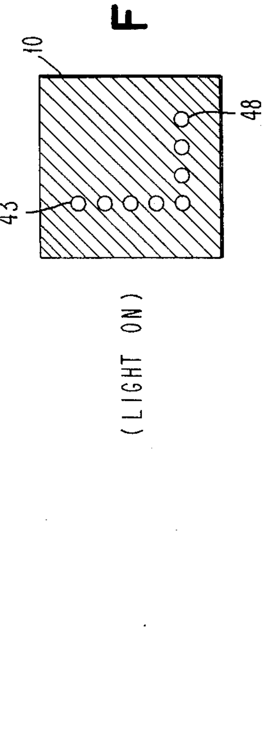
FIG. 5 shows the visual image corresponding to the complete domain pattern in the magnetic sheet when polarized light is incident on the sheet.

In FIG. 4B, the next to the top line of the desired domain pattern is entered into horizontal shift register 34. A cylindrical domain 42 is produced after 0.3T seconds of the second scan as can be seen by referring to the plot in FIG. 4B. Thus, a single domain 43 is produced in magnetic sheet 10 during the second line scan.

During the third line scan, another cylindrical domain 44 is produced in magnetic sheet 10, and cylindrical domain 43 is shifted into the first position (a) of a vertical shift register 36.

During the next line scan an additional cylindrical domain 45 is entered into magnetic sheet 10. After shifting of the domains 43, 44, and 45 in the Y direction, the next line scan produces another cylindrical domain 46 in magnetic sheet 10. This continues until the seventh line (FIG. 4G) during which the bottom line 48 of the desired pattern is entered into magnetic sheet 10. At this time, domains 43, 44, 45, 46, and the line of domains 48 have been introduced into magnetic sheet 10. These domains form the letter L.

Magnetic sheet 10 is then illuminated for 0.5T seconds by polarized light from source 16, and the domains will appear as light areas against the dark background, as shown in FIG. 5. As an alternative, the sheet 10 can be illuminated for T seconds if register 34 is off the viewing screen. That is, light from source 16 can illuminate sheet 10 while a new line of information is being entered into register 34, as long as register 34 cannot be seen by viewer 32.

Thus, a complete character has been entered into magnetic sheet 10 and displayed visually. The entire picture was written into sheet 10 with one pair of input leads (for the conductor loop 40), and no decoding is necessary.

Figures 6, 8:
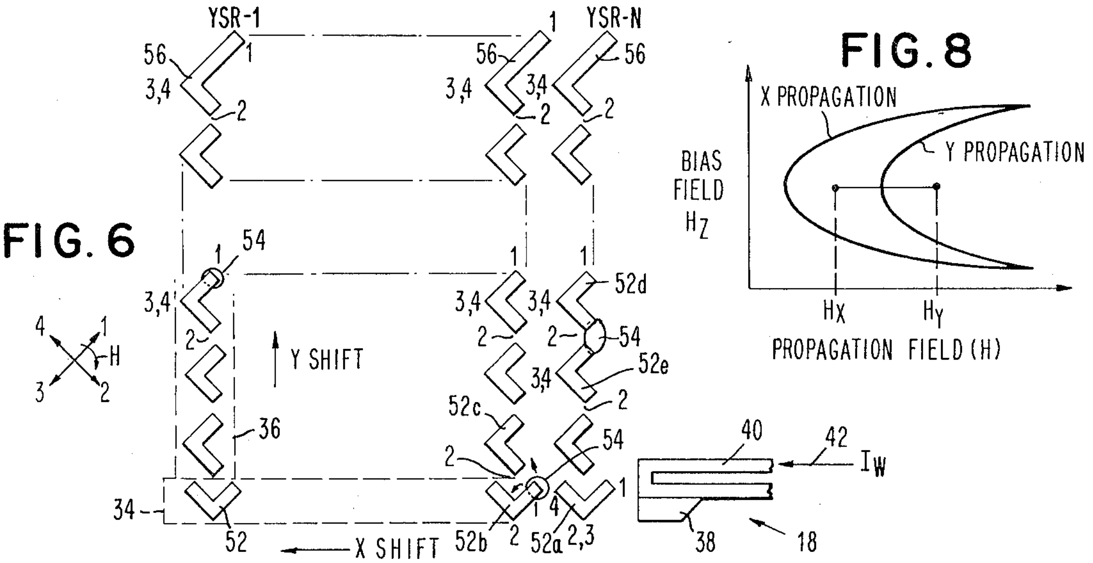
FIGS. 6 and 7 show alternate embodiments for the propagation means illustrated in FIG. 2.
FIG. 8 shows a plot of bias field $H_z$ versus propagation field H for operation of the propagation means shown in FIGS. 6 and 7.
Figure 7:
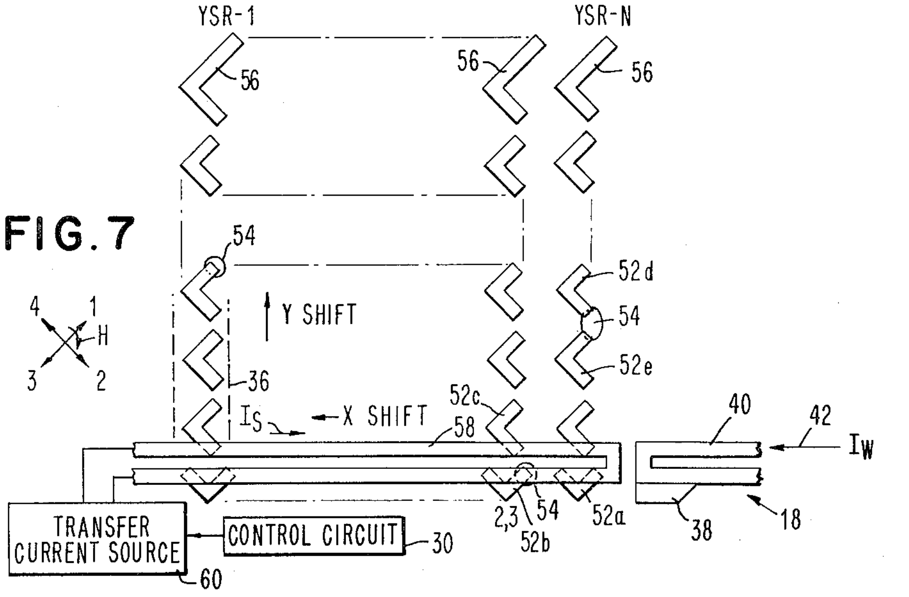

FIG. 6 shows a suitable propagation means 22 using permalloy elements 52 deposited on magnetic sheet 10 (not shown). In FIGS. 6 and 7, elements 52 have a width D/2, each leg is 1.50, and the gap between adjacent elements 52 is 0.3D, where D is the domain diameter. Of course, variations of these relationships will also provide workable devices. Shifting of domains 54 is in response to the rotation of propagation field H in magnetic sheet 10. The last element in each vertical shift register 36 is an elongated permalloy pattern 56 which functions as a domain buster. Also located on magnetic sheet 10 is domain generator 18, comprised of magnetically soft material (permalloy) 38 and conductor loop 40. As with the other figures, the same reference numerals are being used throughout, where possible.

The operation of domain generator 18 has been described with respect to FIG. 2. It will only be mentioned here that a "mother" domain is located on the periphery of permalloy deposit 38. When the propagation field H rotates as shown, that domain moves about the periphery of generator 18. If a sufficiently large write pulse $I_W$ is present in loop 40 while propagation field H is in direction 1, the domain will be attracted to element 52*a*. If $I_W$ is low, the "mother" domain will not be attracted to element 52*a* when H is in direction 1.

As propagation field H rotates, the domain located at pole position 1 of element 52*a* will move to the left (X shift direction). When propagation field H moves to directions 2 and 3, the domain will move down to the corner of element 52*a*. During rotation of magnetic field H to the direction indicated by arrow 4, the domain will move to pole position 4 of element 52*a*. Upon continued rotation of propagation field H the domain will move to element 52*b*.

To perform a Y shift of domain 54 located at pole position 1 of element 52*b*, various techniques exist. One technique depends on the fact that the permalloy elements 52 in the Y shift registers 36 are made thicker than those in the X shift register 34. Changing the magnitude of the propagation field to larger values then creates more attractive poles on the permalloy elements in register 36 than on the elements in register 34. When the magnetic field H is in position 2, a greater attraction will be exerted at pole position 2 by element 52*c* than that at pole position 2 on element 52*b*. Therefore, domain 54 will move to element 52*c*. As the magnetic field H continues its movement, the domain will continue to move in the Y shift direction. Of course, parallel transfer in the Y direction will occur from all bit positions in register 34. Continued shifting in the Y direction will occur as long as the increased amplitude of H is maintained.

As an alternative, all permalloy elements 52 are thick enough so the field for X-propagation does not saturate any of them. The elements 52 in the Y shift registers are spaced apart with a larger gap than that between the elements 52 in the horizontal shift register. Consequently, the field required for propagation in the Y direction is greater than that for propagation in the X direction. When the stronger propagation field is applied, domains 54 will move to pole positions 2 on the permalloy elements in the vertical shift registers, since these poles will be stronger than the corresponding poles on the horizontal shift register elements. The increased strength of these poles is due to the fact that they are closer to the domains 54, and are discrete poles as opposed to the combined, more diffuse poles (2, 3) at the corner of each element 52 in the horizontal shift register.

The terminating elements 56 provide the bubble collapsing function when information contained in the vertical shift registers 36 is to be destroyed. Elements 56 contain an elongated portion so that the bubbles are trapped at the apex (pole positions 3 and 4) of elements 56 as propagation field H rotates. As propagation field H rotates to position 1, a repulsive field which aids field $H_Z$ will be created at the corners of elements 56, causing domains trapped there to collapse. As an alternative, bias field $H_Z$ can be increased to collapse all the domains in sheet 10, but this is a slower, less desirable technique.

Thus, it is apparent that domains are selectively entered into horizontal shift register 34 by the action of the domain generator 18. The propagation field H creates attractive poles along the elements 52 of horizontal register 34 and the domains thus entered propagate in the X direction. When the horizontal shift register 34 is fully loaded, the control circuit 30 (FIG. 1) provides a control pulse to propagation field source 26 (FIG. 1) which changes the magnitude of the propagation field H. This causes all the data in shift register 34 to be shifted in parallel to the first elements (such as 52*c*) of the vertical shift registers 36. After this, another control pulse from control circuit 30 is applied to propagation field source 26, causing the magnitude of the propagation field H to be returned to its original value for shifting in the X direction. Shifting in the X direction affects only the permalloy elements in shift register 34, since the permalloy elements in adjacent vertical shift registers 36 are separated by sufficiently large distances in the X direction. Also, the strength of propagation field H for X shifting is not sufficient to cause Y shifting in any register 36. Under the control of the domain generator 18, a new pattern of domains is placed in horizontal register 34, after which the contents of this register are shifted in parallel to the vertical shift registers 36. This shifting operation also moves the domains previously loaded into the first elements of the vertical shift registers 36 to the second elements in each of these registers. This operation continues until the vertical shift registers 36 contain the entire pattern of cylindrical domains, representative of the image to be viewed. The light source 16 (FIG. 1) is then activated in response to a signal applied by the light activation circuit 17, which is triggered by a pulse from control circuit 30. This light appears when the domains are located between adjacent permalloy elements in the vertical shift register in order to have a maximum light transmission in the areas corresponding to the domain locations. For instance, domain 54 is located between elements 52*d* and 52*e* in vertical shift register YSR–N. This is a position of maximum light transmission.

It is generally preferable to have the domains appear as light areas against the dark background, since the opaque permalloy element 52 will then blend into the background. This means that only the cylindrical domains will be viewed by viewer 32 (FIG. 1).

The light source 16 is activated for 0.5T seconds (FIG. 5.). Repeating the loading operation and light activation every 1/30 second will provide continuous images without flicker.

FIG. 7 is an alternate embodiment for the horizontal shift register 34 and the vertical shift register 36. This embodiment is essentially the same as that shown in FIG. 6, except that a transfer loop 58 has been added to control the shifting of domains from the horizontal shift register 34 to the vertical shift registers 36. The transfer loop is connected to a transfer current source 60 which provides shift current $I_S$ through transfer loop 58 in response to the application of control pulses from control circuit 30.

Since the horizontal shift register 34 and vertical shift registers 36 are the same in FIGS. 6 and 7, operation of the embodiment of FIG. 7 will be explained only with respect to the transfer function whereby domains are shifted from register 34 to registers 36. Current $I_S$ is applied through transfer loop 58 in the direction shown when the propagation field H is located between directions 1 and 2. Current $I_S$ in loop 58 creates a magnetic field which opposes the bias field $H_Z$ inside loop 58 and aids it outside loop 58. Consequently, domains 54 located on element 52*b*, for instance, will move toward the lower net bias field and will be closer to element 52*c* when current $I_S$ flows through loop 58. When field H moves to direction 2, domains 54 will then be attracted to element 52*c* since it is close. Subsequent shifting of domains in the Y direction is the same as that described with respect to FIG. 6. That is, the magnitude of the propagation field H is changed to cause shifting in the Y direction (using either different gaps or different thicknesses of elements 52, as explained previously). The transfer loop 58 is used only to provide the initial transfer of the contents of horizontal register 34 to vertical registers 36.

Other propagation patterns than permalloy patterns can be used to effect propagation in the manner shown here. That is, it is possible to use conductor patterns to load information into a horizontal shift register, after which the information is conducted in a transverse direction by the use of other conductor patterns displaced transversely with respect to the horizontal register. For instance, reference is made to U.S. Pat. No. 3,508,225 (FIG. 2) where domains are propagated from one direction to another in response to current pulses through conductor loops.

As an additional alternative, triangles (wedge-shaped patterns) can be etched into the magnetic sheet 10. Modulating bias field $H_Z$ will cause domain propagation along the direction of the wedges, in a manner analogous to propagation with angelfish patterns. An advantage to this type of propagation is that no permalloy or conductor overlays are present to obscure the visual image of the domain pattern.

The loading operation of a domain pattern involves filling the horizontal register 34 by applying the smaller X propagation field $H_X$ N times, where N is the number of cycles of $H_X$ required to fill horizontal register 34. After this, the Y propagation field $H_Y$ is applied for one cycle (pole positions 1–2–3–4). During application of $H_Y$, no domains are entered into horizontal register 34 by generator 18. The horizontal register 34 is then reloaded and the shifting operation continues as stated. After the total domain pattern is present, light source 16 is activated, after which the domain pattern begins to be destroyed by busters 56.

FIG. 8 shows a plot of the bias field $H_Z$ as a function of the propagation field H for propagation in the X and Y directions in the embodiments of FIGS. 6 and 7. FIG. 8 shows the margin of tolerance of applied drive field for particular bias fields $H_Z$. Above or below certain bias fields information will be lost at the propagation fields corresponding to the X and Y propagation curves. That is, as the propagation field H rotates the domains will collapse at high bias fields due to their being trapped at a position when the localized field produced by propagation field H aids the bias field $H_Z$. If the bias field is too low, the domains enlarge until they occupy more than one bit position, thus destroying the information pattern.

In FIG. 8, when the propagation field has values between the X and Y propagation curves, propagation in the X direction will occur but not in the Y direction. However, when the propagation field increases to values to the right of the Y propagation curve, propagation in the Y direction can occur. When the propagation field is increased to this value ($H_Y$), domains will shift vertically in shift registers 36. In addition, there is no propagation in the X direction in horizontal shift register 34 since no domains are entered into the horizontal shift register 34 by generator 18 when the Y propagation field is applied.

Figure 9:
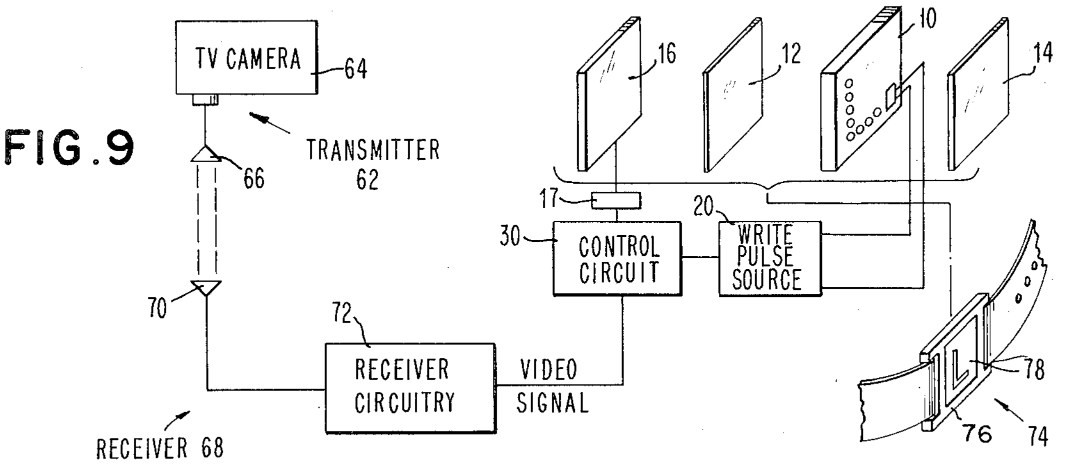
FIG. 9 is a schematic illustration of a TV receiver using the display of FIG. 1.

FIG. 9 shows a television system using the subject invention. Because the light source 16, polarizer 12, magnetic sheet 10 and analyzer 14 can individually be made very small (approximately 1 inch square) and because the combination can be made very thin (approximately 10 mils), it is possible to provide a wrist TV as illustrated in the drawing. Further, the associated receiving circuitry can be located directly below the aforementioned elements or can be contained in a separate small unit.

In more detail, a transmitter 62 is comprised of a conventional TV camera and its associated circuitry, together with a transmitting antenna 66. The transmitter 62 takes the pictures to be sent by antenna 66 to a receiver 68. The receiver is comprised of a receiving antenna 70 and the receiver circuitry 72. This circuitry includes the conventional demodulators, etc. used to convert the input RF signals received by antenna 70 to intermediate frequency signals as is done in conventional television apparatus. A video signal is developed by circuitry 72 and this signal is applied to the control circuit 30. This circuit is the same as shown in FIG. 1, and provides an output to light activation source 17, as well as to write pulse source 20. In addition, propagation field source 26 and bias field source 28 (if used) are also present, although these are not shown here to simplify the drawing.

A schematic illustration of a wrist TV is represented by unit 74, which shows a small case 76 having a face plate 78 on which appears an image of domain pattern "L." Production of this character was described more completely with reference to FIGS. 3A–3G, 4A–4G, and FIG. 5. In other words, the TV camera 64 has scanned a letter "L" and the transmitter 62 has sent RF signals corresponding to that letter to the receiver 68. These signals are decoded by circuitry 72 and the video signal is applied to control circuit 30 which then triggers the write pulse source 20 to enter domains 54 into magnetic sheet 10, corresponding to the letter "L." At this time, the control circuit activates the light activation circuit 17 which in turn energizes light source 16. The character "L" then is visible to a viewer looking at face plate 78 of the wrist unit 74.

The system described here is very useful for display, but also can function as a TV apparatus, compatible with commercial television requirements. The following discussion will detail some of the parameters required for such an application.

TV APPLICATIONS

Requirements for a commercial television are more stringent than those for display purposes. In actual practice, television consists of two interlaced fields, each with 262.5 lines every 1/60 second, resulting in 525 lines every 1/30 second. Of these, 485 are active lines being used for transmission of information. Assuming that the horizontal resolution (which depends upon the risetime and the duration of the video signal pulse) is equal to the vertical resolution (which depends upon the number of scanning lines), and allowing for the fact that the width is approximately 4/3 of the height, the horizontal resolution must be 646 bits/line. Since a line is traversed in 53.5 microseconds, one bit is traversed in 0.083 microsecond.

In a cylindrical magnetic domain screen, this would correspond to the time in which a domain must move from one storage location to the next. A data rate of approximately 12M bits/second would enable an entire commercial TV program to be presented on a 1 inch square screen of magnetic domain material.

The following high mobility materials will suffice to provide the needed data rates. These are:

$Y_3Fe_{3.5}Ga_{1.5}O_{12}$ — mobility greater than 2,000
$Gd_{1.5}Y_{1.5}Fe_{4.52}Al_{0.48}O_{12}$ — mobility greater than 2,000
$Sm_{0.37}Gd_2Dy_{0.63}Fe_5O_{12}$ — mobility greater than 2,000

Use of these materials will provide data rates of $12 \times 10^6$ bits (domains)/second.

The light source 16 can be a light emitting diode or a group of diodes arranged in parallel to provide one output beam. This is provided by integrated circuit techniques so that complex interconnections would not be required. A suitable light emitting diode is shown in an article by Hillman and Smith, IEEE Spectrum, January 1968, at pages 62–66. This diode provides 1,000 foot lamberts at less than 15 milliamps input. Use of a light input of 1,000 foot-lamberts will enable the transmission of 20 foot-lamberts from the magnetic sheet 10 which can be viewed directly. The illumination from source 16 can come from a flat type source directly behind magnetic material 10 or it can be brought to the sample by light pipes (optical fibers) from a remote location.

As will be more fully apparent later, the wave-length of the light source is matched to the material in the magnetic sheet 10 to give a maximum Faraday rotation. This leads to a greater contrast between the light transmitted when a domain is present and that blocked when no domain is present. As is taught by the prior art (U.S. Pat. No. 3,515,456) the thickness of magnetic sheet 10 is chosen to give a maximum Faraday rotation, limited either by birefringence or optical absorption.

The magnetic bias field $H_Z$ required is the same as that for any known magnetic domain device. For instance, a field of 25–50 Oe. is suitable.

BRIGHTNESS, CONTRAST, AND MATERIAL SELECTION

The transmitted light intensity of a magnetic sheet with an antireflection coating placed between polarizing elements is given by $$I_T(\pm\theta_F) = I_o \exp(-\alpha t)\,[\sin^2(\phi_{pa} \pm \theta_F) + \Delta] \quad (1)$$

where $I_o$ = incident light intensity
$\alpha$ = optical absorption constant of magnetic sheet
$t$ = magnetic sheet thickness
$\phi_{pa}$ = angular deviation of polarizer-analyzer from extinction position (no light passes)
$\theta_F$ = magnitude of Faraday rotation
$\Delta$ = extinction coefficient of polarizer-magnetic sheet-analyzer combination.

A magnetic domain and its surroundings impart opposite rotations $\pm\theta_F$ to transmitted light, and the resulting difference in light intensities, $I_T(+\theta_F) - I_T(-\theta_F)$, is used for display purposes. The magnitude of this rotation is given by $$\theta_F = (2F/\delta)\sin(\delta t/z) \quad (2)$$

where F = intrinsic Faraday rotation and
$\delta$ is the birefringent phase retardation.
For negligible birefringence ($\delta t << 1$), equation 2 reduces to $\theta_F = Ft$.

From the magneto-optic standpoint, the optimum magnetic sheet thickness is that which maximizes $I_T(+\theta_F)$, the light transmitted in the presence of a magnetic domain. For display, $\phi_{pa}$ must be chosen to obtain an adequate contrast $$C = [I_T(+\theta_F) - I_T(-\theta_F)]/I_T(\theta_F) \quad (3)$$

Given the fact that practical values of $\theta_F$ for most magnetic materials are only a few degrees, adequate contrast (for instance, 10) is obtained when $\phi_{pa}$ is only slightly larger than $\theta_F$. Thus $I_T(+\theta_F)$ is a quadratic function of $\theta_F$ and will be a maximum for a thickness $t = 2/\alpha$, for which $\theta_F = 2F/\alpha$ in the absence of birefringence.

This is the maximum practical Faraday rotation referred to earlier for the case when birefringence is absent, and is a magneto-optic figure of merit characteristic of the material being used. When birefringence is present, the maximum practical Faraday rotation, obtained by using an optical compensator such as a quarter-wave plate, is $2F/\delta$, which then becomes the figure of merit in this case. Therefore, all other things being equal, that material should be chosen which has the highest magneto-optic figure of merit.

What has been shown is a cylindrical magnetic domain system suitable for both display and television applications. This apparatus uses a serial/parallel converter to move magnetic domains within a sheet to locations corresponding to the image to be presented. Operation in this manner is fast and data rates compatible with commercial TV applications and easily realizable. Alternate embodiments exist for the propagation means comprising the serial-to-parallel converter and for the domain generators, light source, etc. A serial-parallel arrangement allows high data rates and facilitates placement of domains without accessory decoding circuitry while minimizing the number of interconnections. Variations of the serial-parallel propagation mode can be envisioned using a plurality of horizontal shift registers in conjunction with the vertical shift registers. However, it should be realized that such arrangements are within the scope of the propagation mode described herein.

What is claimed is:

1. A display system using cylindrical magnetic domains comprising:

a magnetic medium in which said domains can be propagated, writing means for generating said domains in said medium in response to data signals indicative of said information, propagation means for moving said domains in said medium to form a domain pattern corresponding to said information, said propagation means comprising a first section for moving said domains serially from said writing means to first locations in said magnetic medium and a second section for moving said domains in parallel in a direction substantially transverse to the direction of movement of domains in said first section, means for activating said first and second sections repetitively to form said domain pattern in said medium, propagation in each of said sections not affecting propagation in said other section, said propagation means being comprised of magnetically soft material deposited in patterns to form said first and second sections and said means for activating said first and second sections being comprised of means for producing a reorienting magnetic field in the plane of said sheet, the magnetically soft material in said second section having a different thickness than that in said first section, light means for producing polarized light incident on said domain pattern in said magnetic medium, control means connected to said writing means, said propagation means, and said light means to activate said propagation means to load said domain pattern in said medium before said light means is activated, control pulses from said control means causing said writing means to produce domains in said first section while said second section is moving domains previously located in said first section, analyzer means for differentiating light which passes through those regions of the magnetic medium containing domains from that which passes through regions of said magnetic medium which do not contain said domains.

2. A display system using cylindrical magnetic domains comprising:

a magnetic medium in which said domains can be propagated, bias means for stabilizing the diameter of domains in said magnetic medium, writing means for generating said domains in said medium in response to data signals applied thereto, first propagation means for serially moving domains in a first direction across said medium to first storage positions, second propagation means associated with said first storage means for moving domains in a second direction across said medium to second storage positions to produce a domain pattern in said medium representative of information to be displayed, said first and second propagation means being comprised of patterns of magnetically soft elements adjacent to said magnetic medium, there being means for producing a reorienting magnetic field in said magnetic medium, where the elements in said first propagation means are of different thickness than the elements in said second propagation means, means connected to said writing means and to said first and second propagation means to control the operation of said first and second propagation means and said writing means, light means for providing polarized light incident on said magnetic medium for illumination of said domain pattern, analyzer means for differentiating light which passes through said magnetic domains from that which does not pass through said magnetic domains, means for removing said domains after said light means is activated.

3. A display system using cylindrical magnetic domains comprising:

a magnetic medium in which said domains can be propagated, bias means for stabilizing the diameter of domains in said magnetic medium, writing means for generating said domains in said medium in response to data signals applied thereto, first propagation means for serially moving domains in a first direction across said medium to first storage positions, second propagation means associated with said first storage means for moving domains in a second direction across said medium to second storage positions to produce a domain pattern in said medium representative of information to be displayed, said first and second propagation means being comprised of patterns of magnetically soft elements adjacent to said magnetic medium, there being means for producing a reorienting magnetic field in said magnetic medium, where the elements in said first propagation means are separated by different distances than those in said second propagation means, means connected to said writing means and to said first and second propagation means to control the operation of said first and second propagation means and said writing means, light means for providing polarized light incident on said magnetic medium for illumination of said domain pattern, analyzer means for differentiating light which passes through said magnetic domins from that which does not pass through said magnetic domains, means for removing said domains after said light means is activated.

4. A system for displaying information using cylindrical magnetic domains, comprising:

a magnetic medium in which said domains can be propagated, writing means for generating said domains in said medium in response to control signals applied thereto, first propagation means located adjacent to said writing means for moving domains serially from said writing means to first positions in said magnetic medium, second propagation means located adjacent to said first propagation means for moving domains in parallel from said first positions to second positions in said medium to provide a pattern of domains representative of said information, said first and second propagation means having different propagation thresholds, control means for activating said first and second propagation means and for operating said writing means, a light source for providing polarized light incident on said domain pattern in said magnetic medium after said domains are propagated to desired locations in said medium by said first and second propagation means, analyzer means for differentiating light which passes through said domain pattern from that which passes through said magnetic medium in regions where said domains are not present.

5. The system of claim 4, where said second propagation means moves said domains in a direction substantially transverse to the direction in which said domains are moved by said first propagation means.

6. The system of claim 4, further including means for producing a light image of the information to be presented on said display system and means for scanning said image to produce data signals corresponding to said light image, said data signals being applied to said writing means.

7. A display system using cylindrical magnetic domains comprising:

a magnetic medium in which said domains can be propagated, writing means for generating said domains in said medium in response to data signals indicative of information, propagation means for moving said domains in said medium to form a domain pattern corresponding to said information, said propagation means comprising a first section for moving said domains serially from said writing means to first locations in said magnetic medium and a second section for moving said domains in parallel in a direction substantially transverse to the direction of movement of domains in said first section, means for activating said first and second sections to form said domain pattern in said medium, propagation in each of said sections not affecting propagation in the other said section, said propagation means being comprised of magnetically soft material in patterns to form said first and second sections, and said means for activating said first and second sections is comprised of means for producing a reorienting magnetic field in said medium, wherein said first and second sections of said propagation means have different domain propagation thresholds, and said reorienting magnetic field has controllably variable magnitudes, light means for producing polarized light incident on said domain pattern in said magnetic medium, control means connected to said writing means, said propagation means and said light means to activate said propagation means to load said domain pattern in said medium and to activate said light means, analyzer means for differentiating light which passes through those regions of the magnetic medium containing domains from that which passes through regions of said magnetic medium which do not contain said domains.

8. A display system using cylindrical magnetic domains comprising:

a magnetic medium in which said domains can be propagated, bias means for stabilizing the diameter of domains in said magnetic medium, writing means for generating said domains in said medium in response to data signals applied thereto, first propagation means for serially moving domains in a first direction across said medium to first storage positions, second propagation means associated with said first storage means for moving domains in a second direction across said medium to second storage positions to produce a domain pattern in said medium representative information to be displayed, said first and second propagation means being comprised of patterns of magnetically soft elements adjacent to said magnetic medium, there being means for producing a reorienting magnetic field in said magnetic medium, wherein said first and second propagation means have different propagation thresholds, means connected to said writing means and to said first and second propagation means to control the operation of said first and second propagation means and said writing means, light means for providing polarized light incident on said magnetic medium for illumination of said domain pattern, analyzer means for differentiating light which passes through said magnetic domains from that which does not pass through said magnetic domains, means for removing said domains after said light means is activated.

9. The system of claim 8, including transfer means for changing the magnitude of said reorienting magnetic field.

10. A system for displaying patterns of magnetic bubble domains representative of information comprising:

a magnetic medium in which said domains can be propagated, writing means for generating said domains in said medium in response to data signals applied thereto, a first shift register extending in a first direction across said medium, said shift register being comprised of elements for moving said domains in response to drive pulses applied thereto, a plurality of second shift registers extending in a second direction, said second shift registers being comprised of further ones of said elements for moving domains in said second direction in response to drive pulses applied thereto to produce a pattern of said domains representative of information to be displayed, drive means for applying said drive pulses to said elements, said first and second shift registers being comprised of magnetically soft elements located adjacent to said sheet and said drive means being comprised of means for producing a reorienting magnetic field in the plane of said sheet, the domain propagation threshold in said first shift register being different from that in said second shift register, said drive means including means for changing the magnitude of said reorienting magnetic field, transfer means for transferring all domains in said first shift register to said second shift registers for movement therein in said second direction, light means for providing polarized light incident on said magnetic medium for illumination of said domain pattern, analyzer means for differentiating light which passes through said magnetic domains from that which does not pass through said magnetic domains, control means connected to said writing means and to said drive means and to said transfer means for providing control pulses to activate said writing means, drive means, and transfer means, removal means for removing domains in said medium from said domain pattern after said light source is activated.

* * * * *